United States Patent
Sakai et al.

(10) Patent No.: US 7,283,337 B2
(45) Date of Patent: Oct. 16, 2007

(54) ABUTTED EXCHANGE BIAS DESIGN FOR SENSOR STABILIZATION

(75) Inventors: Masanori Sakai, Cupertino, CA (US);
Kunliang Zhang, Milpitas, CA (US);
Kenichi Takano, Cupertino, CA (US);
Chyu-Jiuh Torng, Pleasanton, CA (US); Yunfei Li, Fremont, CA (US);
Po-Kang Wang, San Jose, CA (US)

(73) Assignee: Headway Technologies, Inc., Mipitas, CA (US)

( * ) Notice: Subject to any disclaimer, the term of this patent is extended or adjusted under 35 U.S.C. 154(b) by 421 days.

(21) Appl. No.: 11/074,270

(22) Filed: Mar. 4, 2005

(65) Prior Publication Data

US 2006/0198059 A1  Sep. 7, 2006

(51) Int. Cl.
*G11B 5/127* (2006.01)
(52) U.S. Cl. .................................. 360/324.12
(58) Field of Classification Search ........... 360/324.12, 360/324.1
See application file for complete search history.

(56) References Cited

U.S. PATENT DOCUMENTS

| | | | | |
|---|---|---|---|---|
| 5,696,654 | A * | 12/1997 | Gill et al. ................. | 360/315 |
| 5,754,376 | A | 5/1998 | Kobayashi et al. ......... | 360/113 |
| 6,219,207 | B1 * | 4/2001 | Pinarbasi ................... | 360/322 |
| 6,266,218 | B1 * | 7/2001 | Carey et al. ............ | 360/324.12 |
| 6,338,899 | B1 | 1/2002 | Fukuzawa et al. .......... | 428/332 |
| 6,469,878 | B1 | 10/2002 | Mack et al. ........... | 360/324.12 |
| 6,545,847 | B2 | 4/2003 | Nakamoto et al. ....... | 360/324.1 |
| 6,636,400 | B2 * | 10/2003 | Pinarbasi et al. ...... | 360/324.12 |
| 6,697,236 | B2 * | 2/2004 | Gill ........................ | 360/324.12 |
| 6,760,966 | B2 | 7/2004 | Wang et al. ............. | 29/603.14 |
| 6,779,248 | B2 | 8/2004 | Dovek et al. ............ | 29/603.08 |
| 2003/0179518 | A1 * | 9/2003 | Gill ........................ | 360/324.12 |
| 2004/0075960 | A1 * | 4/2004 | Li et al. ................. | 360/324.12 |
| 2004/0105192 | A1 | 6/2004 | Chien et al. | |
| 2004/0191354 | A1 | 9/2004 | Baresich et al. | |
| 2005/0068696 | A1 * | 3/2005 | Chau et al. ............ | 360/324.12 |
| 2006/0114622 | A1 * | 6/2006 | Gill ........................ | 360/324.12 |
| 2006/0132989 | A1 * | 6/2006 | Zhang et al. .......... | 360/324.12 |

OTHER PUBLICATIONS

Co-pending U.S. Appl. No. 11/074,244, filed Mar. 4, 2005, Assigned to the Same Assignee.

* cited by examiner

*Primary Examiner*—Allen Cao
(74) *Attorney, Agent, or Firm*—Saile Ackerman LLC; Stephen B. Ackerman

(57) ABSTRACT

A hard bias (HB) structure for biasing a free layer in a MR sensor within a magnetic read head is comprised of a main biasing layer with a large negative magnetostriction ($\lambda_S$) value. Compressive stress in the device after lapping induces a strong in-plane anisotropy that effectively provides a longitudinal bias to stabilize the sensor. The main biasing layer is formed between two FM layers, and at least one AFM layer is disposed above the upper FM layer or below the lower FM layer. Additionally, there may be a Ta/Ni or Ta/NiFe seed layer as the bottom layer in the HB structure. Compared with a conventional abutted junction exchange bias design, the HB structure described herein results in higher output amplitude under similar asymmetry sigma and significantly decreases sidelobe occurrence. Furthermore, smaller MRWu with a similar track width is achieved since the main biasing layer acts as a side shield.

20 Claims, 6 Drawing Sheets

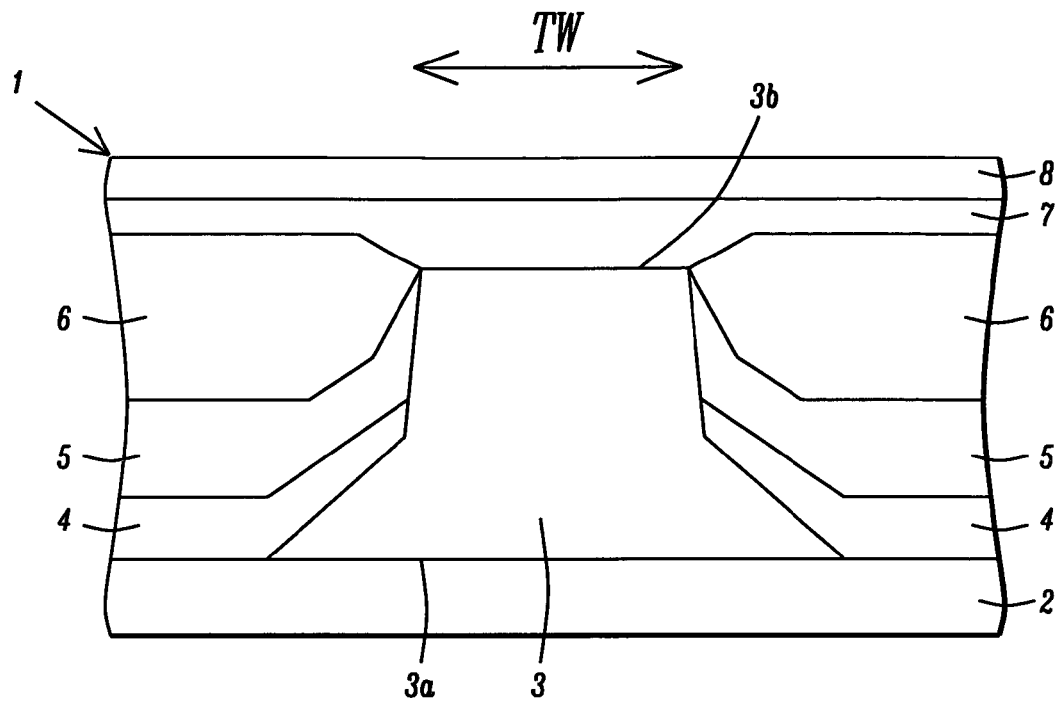
FIG. 1 – Prior Art
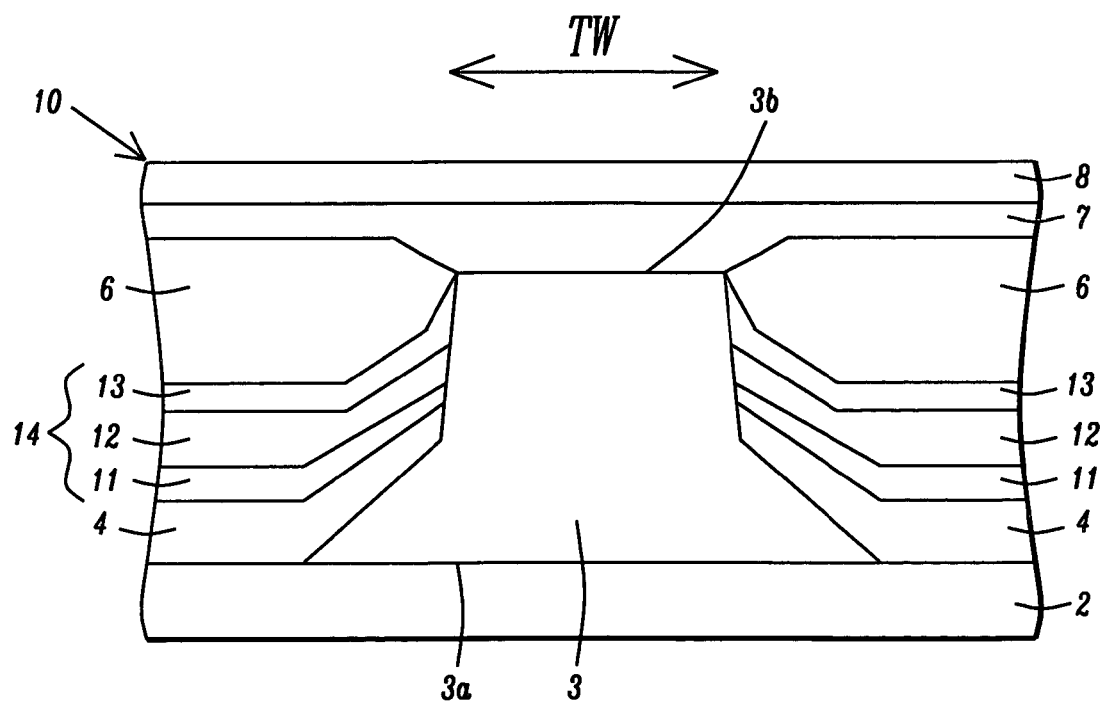
FIG. 2

US 7,283,337 B2

ABUTTED EXCHANGE BIAS DESIGN FOR SENSOR STABILIZATION

This application is related to U.S. patent application Ser. No. 11/074,244 and filed Mar. 4, 2005, owned by a common assignee as the instant invention.

FIELD OF THE INVENTION

The invention relates to an improved abutted junction exchange (ABJ-EX) bias structure formed adjacent to a magnetoresistive (MR) sensor in a magnetic read head. In particular, a high negative magnetostriction ferromagnetic material is used as the main biasing layer in an ABJ-EX structure to suppress side-lobe occurrence while maintaining read back sensitivity.

BACKGROUND OF THE INVENTION

In a magnetic recording device in which a read head is based on a tunneling magnetoresistive (TMR) sensor or a giant magnetoresistance (GMR) sensor, there is a constant drive to increase recording density. One method of accomplishing this objective is to decrease the size of the sensor element in the read head that is suspended over a magnetic disk on an air bearing surface (ABS). The sensor is a critical component in which different magnetic states are detected by passing a sense current there through and monitoring a resistance change. In a GMR configuration, two ferromagnetic layers are separated by a nonmagnetic conductive layer in the sensor stack while in a TMR sensor, a tunnel barrier layer such as $Al_xO_y$ separates the two ferromagnetic layers. One of the ferromagnetic layers is a pinned layer wherein the magnetization direction is fixed by exchange coupling with an adjacent anti-ferromagnetic (AFM) pinning layer. The second ferromagnetic layer is a free layer wherein the magnetization vector can rotate in response to external magnetic fields. In the absence of an external magnetic field, the magnetization direction of the free layer is aligned perpendicular to that of the pinned layer by the influence of hard bias layers on opposite sides of the sensor stack. When an external magnetic field is applied by passing the sensor over a recording medium on the ABS, the free layer magnetic moment may rotate to a direction which is parallel to that of the pinned layer.

A sense current is used to detect a resistance value which is lower when the magnetic moments of the free layer and pinned layer are in a parallel state. In a CPP configuration, a sense current is passed through the sensor in a direction perpendicular to the layers in the sensor stack. Alternatively, there is a current-in-plane (CIP) configuration where the sense current passes through the sensor in a direction parallel to the planes of the layers in the sensor stack.

Ultra-high density (over 100 Gb/in$^2$) recording requires a highly sensitive read head in which the cross-sectional area of the sensor is typically smaller than 0.1×0.1 microns at the ABS plane. Current recording head applications are typically based on an abutting junction (ABJ) configuration in which a hard bias layer is formed adjacent to each side of a free layer in a GMR spin valve structure. As the recording density further increases and track width decreases, the junction edge stability becomes more important so that edge domain formations in the free layer are prevented. In other words, longitudinal biasing is necessary so that a single domain magnetization state in the free layer will be stable against all reasonable perturbations while the sensor maintains relatively high signal sensitivity.

In longitudinal biasing read head design, films of high coercivity material are abutted against the edges of the GMR sensor and particularly against the sides of the free layer. By arranging for the flux flow in the free layer to be equal to the flux flow in the adjoining hard bias layer, the demagnetizing field at the junction edges of the aforementioned layers vanishes because of the absence of magnetic poles at the junction. As the critical dimensions for sensor elements become smaller with higher recording density requirements, the minimum longitudinal bias field necessary for free layer domain stabilization increases.

A high coercivity in the in-plane direction is needed in the hard bias layer to provide a stable longitudinal bias that maintains a single domain state in the free layer and thereby avoids undesirable Barkhausen noise. This condition is realized when there is a sufficient in-plane remnant magnetization ($M_r$) which may also be expressed as $M_rt$ since $M_r$ is dependent on the thickness (t) of the hard bias layer. $M_rt$ is the component that provides the longitudinal bias flux to the free layer and must be high enough to assure a single magnetic domain in the free layer but not so high as to prevent the magnetic field in the free layer from rotating under the influence of a reasonably sized external magnetic field.

Referring to FIG. 1, a conventional abutted junction hard bias (ABJ-HB) structure in a read head 1 with a GMR sensor is shown. The substrate 2 may be comprised of a first gap layer on a first shield layer (not shown). Note that the sensor element generally has sloped sidewalls wherein the top surface 3b is narrower than the bottom surface 3a. Moreover, the sensor element 3 may be a bottom spin valve, a top spin valve, or a multilayer spin valve. In a typical bottom spin valve configuration (not shown), a seed layer, AFM layer, pinned layer, spacer, free layer, and a cap layer are successively formed on the substrate. A top spin valve (not shown) generally has a seed layer, free layer, spacer, pinned layer, AFM layer, and cap layer successively formed on the substrate.

The ABJ-HB structure consists of a seed layer 4 formed on the substrate 2 and along each side of the sensor element 3, and the overlying hard bias layers 5 that have a proper microstructure due to the crystalline nature of the seed layers. The hard bias layers 5 form an abutting junction on either side of the free layer (not shown) in the sensor element 3. Leads 6 are provided on the hard bias layers 5 to carry current to and from the sensor element 3. The distance between the leads 6 defines the track width TW of the read head 1. Above the leads 6 and sensor element 3 are successively formed a second gap layer 7 and a second shield layer 8.

The conventional ABJ-HB design has been employed for magnetic sensor stabilization for several production generations. However, with further reduction of the magnetic read width (MRWu) to less than 0.3 microns, the ABJ-HB configuration tends to fail in producing sufficient biasing efficiency. In other words, the conventional ABJ-HB structure either reduces the sensor amplitude too much or causes a loss in sensor stability when the hard bias layer is either too thick or too thin. Moreover, the dead zone which is the area in the sensor element between the MRWu and the track width is always large. Therefore, further optimization in hard bias materials or in junction geometry is necessary to achieve high performance magnetic read heads that satisfy the newest design requirements.

In related art, an additional AFM layer is provided between a hard bias layer and an overlying lead in U.S. Pat. No. 6,779,248 so that there is no fail off in bias strength before the edge of the gap is reached. In U.S. Pat. No. 6,760,966, a soft magnetic layer is added above hard bias layers to provide flux closure to the hard bias layers and thereby prevent flux leakage into the gap region.

A magnetoresistive effect head with an improved output is described in U.S. Pat. No. 6,545,847 and includes a design wherein the hard bias structure is comprised of a stacked layer of an alloy of NiFe and an AFM film such as FeMn, NiMn, or CrMn. The hard bias structure is disposed on a seed layer and below an electrode.

In U.S. Pat. No. 5,754,376, a longitudinal bias applied to a soft magnetic layer is weak enough that the sense current flowing through the magnetoresistive (MR) conductive layer sufficiently magnetizes a SAL transversely.

U.S. Pat. No. 6,469,878 disdoses exchange tabs which are formed above and adjacent outer portions of a free layer to bias the free layer. The exchange tabs are formed from the same AFM material as in the first pinning layer.

In U.S. Patent Application 2004/0105192, poor squareness and coercivity resulting from lattice distortion in a seed layer that contacts an AFM layer in a bottom spin valve is corrected by inserting a NiCr, NiFe, or Cr film between the seed layer and AFM layer thereby producing a smoother surface onto which the longitudinal bias structure is deposited.

A longitudinal bias layer comprised of an AFM layer formed over a ferromagnetic layer of Fe, Co, Ni, or NiFe which is disposed on either side of a protective film on a free layer is described in U.S. Pat. No. 6,338,899. The longitudinal bias structure may also be a laminate that includes an underlayer/FM layer/AFM layer configuration.

In U.S. Patent Application 2002/0191354, a sidewall layer is formed on a magneto-resistive element by oxidizing, nitrifying, fluoridating, carbonizing, sulfurating, or boronizing the side surface of the MR element. The specular reflecting effect is increased while the sidewall layer maintains the biasing effect of an adjacent hard bias structure.

SUMMARY OF THE INVENTION

A first objective of the present invention is to provide a hard bias structure for biasing a sensor element in a magnetic read head that suppresses side-lobes during a readback operation.

A further objective of the present invention is to provide a hard bias structure according to the first objective that also results in a higher output amplitude under a similar asymmetry sigma.

A still further objective of the present invention is to provide a method of making a hard bias structure for longitudinally biasing a free layer in a magnetoresistive sensor element according to the first two objectives.

According to a first embodiment, these objectives are achieved by providing a magnetoresistive (MR) sensor element with sidewalls and a top surface that is formed on a substrate in a magnetic read head. The MR sensor element can have a top spin valve, bottom spin valve, or multilayer structure that is formed along an ABS plane and is comprised of an AFM layer, a pinned layer, a free layer, and a capping layer. The pinned layer is pinned in a first direction perpendicular to the ABS plane and parallel to the top surface of the substrate by exchange coupling with an adjacent AFM layer. The free layer is separated from the pinned layer by a spacer (in a GMR sensor) or tunnel barrier layer (in a TMR sensor) and is longitudinally biased in a direction parallel to the ABS plane by a hard bias structure on either side of the MR sensor element. The hard bias structure is a stack of layers disposed on the substrate and along the sidewalls of a GMR-CIP sensor or on an $Al_2O_3$ insulation layer in a TMR or GMR-CPP sensor.

In one aspect, the hard bias stack has a seed/AFM1/FM/HB/FM/AFM2 configuration wherein the bottom seed layer has a composition and crystal structure that produces a sufficiently large exchange coupling field ($H_{EX}$) and a small coercivity ($H_C$). The AFM1 and AFM2 layers can be any antiferromagnetic film but preferably have a low critical thickness. Ni or another material with a high negative magnetostriction value (compressive stress) is selected as the main hard bias (HB) layer so that after the device is lapped, the resulting compressive stress will induce a strong in-plane anisotropy to produce a sufficient longitudinal bias for stabilization. The HB layer is sandwiched between two ferromagnetic (FM) layers to enhance the exchange coupling strength with the AFM1 and AFM2 layers. Optionally, the seed layer may be removed to reduce the spacing between the MR sensor element and HB layer. In an alternative embodiment, the AFM2 layer may be removed in order to reduce the shield to shield topography (sensor thickness) even though $H_{EX}$ may be decreased somewhat.

The present invention also encompasses a second embodiment wherein the hard bias stack has a seed/FM/HB/FM/AFM1 configuration. In this case, the composition and thicknesses of the layers within the hard bias stack are the same as in the first embodiment but the order of the layers is different. The hard bias stack of the second embodiment may be preferred when stabilizing a top spin valve sensor although a bottom spin valve sensor could also be stabilized by this configuration.

The hard bias stack is magnetized in a direction orthogonal to that of the pinned layer and parallel to the top surface of the MR sensor element. The hard bias structure is magnetically coupled to the free layer and provides a longitudinal (in-plane) bias that ensures a single magnetic domain within the free layer. In an embodiment where the MR sensor element is based on a GMR-CIP design, electrical leads are formed above the hard bias stack and contact the sensor along its sidewalls on or near the top surface of the capping layer. A second gap layer is formed on the leads and on the GMR-CIP sensor and a second shield is formed on the second gap layer to complete the magnetic read head. In an embodiment where the HB stack is formed on a first insulation layer near the sides of a GMR-CPP sensor or TMR sensor, a second insulation layer may be disposed on the HB structure and then a top shield is formed above the second insulation layer and sensor element. The first insulation layer separates the bottom and top shields to prevent a short circuit.

The present invention is also a method of forming a magnetic read head comprised of an improved hard bias structure according to the first and second embodiments. A MR sensor stack comprised of a free layer, pinned layer, an AFM layer, and a capping layer is formed on a substrate by a conventional method. Known methods are also employed to pattern a photoresist mask above the capping layer in the MR sensor stack. An etch process may be used to define a MR sensor element and a track width. In the case of a GMR-CIP sensor, a seed layer is deposited on exposed portions of the substrate adjacent to the sensor element. Next, the remainder of the hard bias stack is deposited on the seed layer and along a substantial portion of the sidewalls on the sensor element. The hard bias stack described in the first or second embodiment is formed by a magnetron sputtering or an ion beam deposition (IBD) method.

The hard bias structure may be magnetically aligned in a direction parallel to the top surface of the MR sensor element and parallel to the ABS by applying an external magnetic field during or after the deposition step. Electrical leads are subsequently formed on the hard bias structure by a conventional method. The photoresist layer is then removed by a lift-off process, for example. A second gap layer and second shield are sequentially formed on the electrical leads and GMR-CIP sensor by well known methods. Alternatively, the substrate is a bottom shield and an upper shield is formed on a GMR-CPP or TMR sensor and above an adjacent stack comprised of a first insulation layer, hard bias structure of the first or second embodiment, and optional second insulation layer by a conventional method.

BRIEF DESCRIPTION OF THE DRAWINGS

FIG. 1 is a cross-sectional view showing a prior art magnetic read head having a conventional ABJ-HB configuration adjacent to a sensor element.

FIG. 2 is a cross-sectional view that depicts a magnetic read head with an ABJ-EX hard bias configuration adjacent to a sensor element.

DETAILED DESCRIPTION OF THE INVENTION

Figure 3:
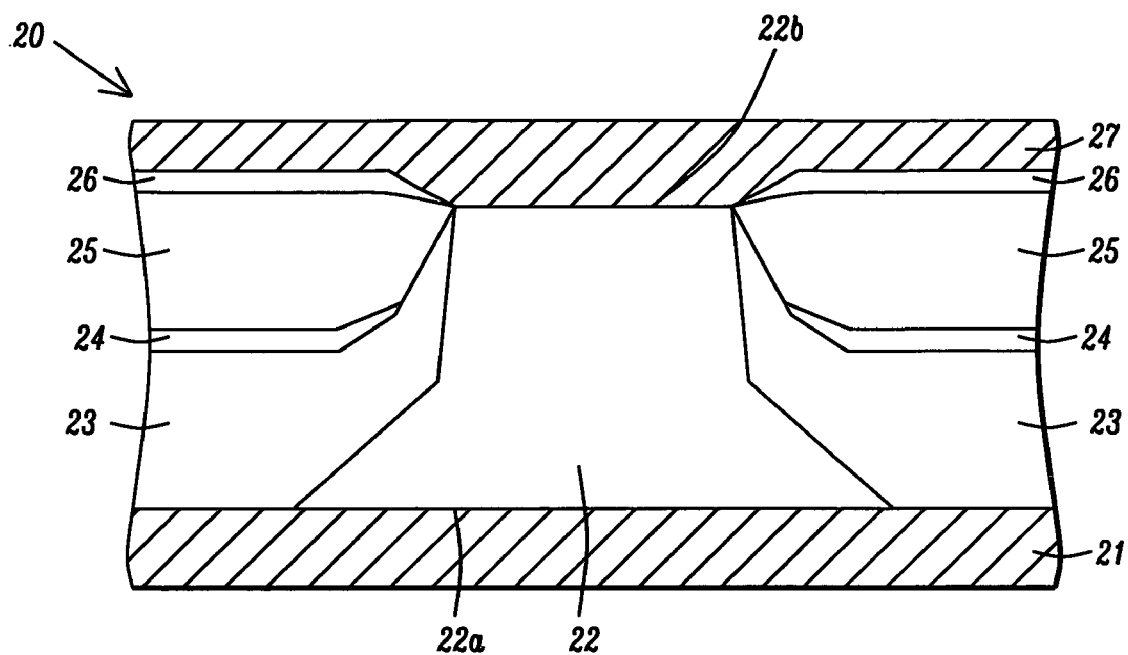
FIG. 3 is a cross-sectional view of a magnetic read head with a GMR-CPP or TMR sensor and an ABJ-EX hard bias stack sandwiched between two insulation layers.

The present invention is a hard bias configuration comprised of a main biasing layer with a high negative magnetostriction value ($\lambda_S$) that improves the performance of a magnetic read head based on a magnetoresistive (MR) sensor element. Although the exemplary embodiments describe GMR-CIP, GMR-CPP, or TMR sensors having a single spin valve, those skilled in the art will appreciate that the present invention may also apply to multilayer sensor designs based on a GMR, TMR, or spin valve magnetoresistive (SVMR) effect. The drawings are provided by way of example and are not intended to limit the scope of the invention. For example, the shape of a MR element in a magnetic device is not a limitation and the present invention encompasses any configuration wherein a hard bias stack as described in the first or second embodiment maintains a single magnetic domain in a free layer within the MR sensor element. Moreover, the MR sensor element may be comprised of either a top spin valve or a bottom spin valve. The present invention is also a method of forming a magnetic read head with a hard bias configuration wherein a main biasing layer with a high negative $\lambda_S$ value significantly reduces sidelobe occurrence, provides better biasing efficiency, and has a smaller MRWu for a given track width.

An abutted-junction exchange bias (ABJ-EX) structure shown in FIG. 2 has been proposed by the inventors to provide effective biasing for sensor stabilization. The read head 10 has an ABJ-EX stack 14 comprised of an AFM1/HB/AFM2 configuration formed between a seed layer 9 and an electrode (lead) 6 and adjacent to a GMR (CIP) sensor 3 wherein the AFM1 layer 11 and AFM2 layer 13 are IrMn and the hard bias layer 12 is NiFe, for example. A NiFe hard bias layer 12 is used to provide enough $M_r t$ for biasing and the two IrMn layers are employed to produce a larger exchange bias value. Since the NiFe hard bias layer acts like a side shield, it offers some advantages over the traditional ABJ-HB scheme in that the sharpness of the microtrack profile is enhanced and the size of the dead zone is reduced. The ABJ-EX structure has a further advantage because it has a narrower MRWu than the ABJ-HB configuration at the same GPC CD (track width) generated by a photolithography process.

In FIG. 3, an example of the ABJ-EX stack 25 with an AFM1/HB/AFM2 configuration (similar to ABJ-EX stack 14) that is incorporated in a read head 20 and adjacent to a GMR (CPP) or TMR sensor 22 is shown. The bottom surface 22a of the sensor is formed on a bottom shield 21 while the top surface 22b contacts a top shield 27. The ABJ-EX stack 25 may be disposed on a seed layer 24 and positioned above a first Al$_2$O$_3$ insulation layer 23 and below a second insulation layer 26.

Figure 4:
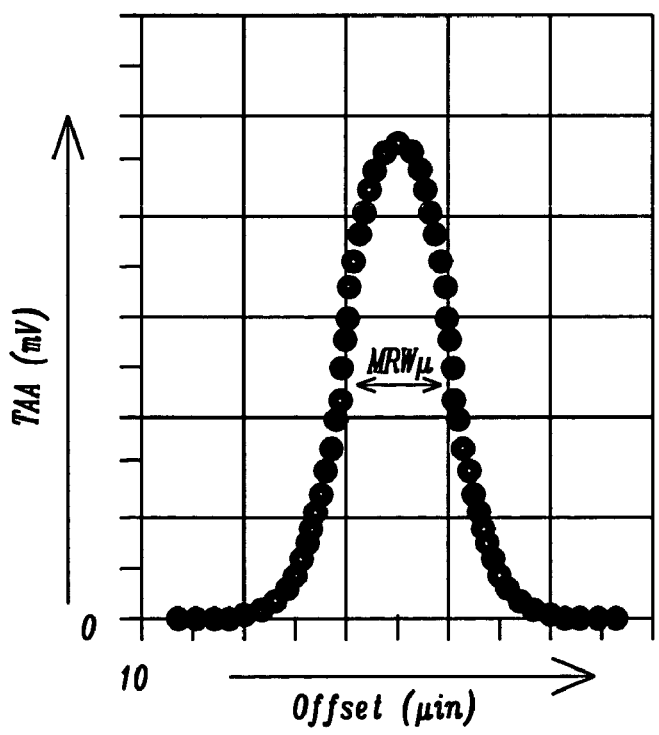
FIG. 4 depicts a typical microtrack profile and a magnetic read width (MRWu) determined at a level which is half of the maximum amplitude.
Figure 5:
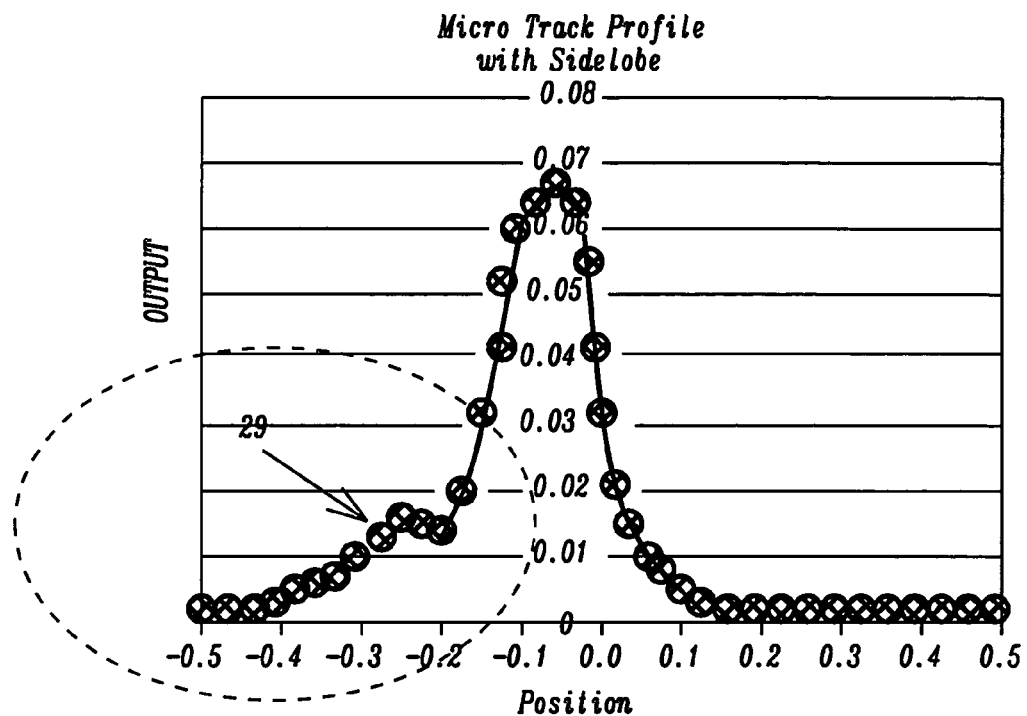
FIG. 5 shows a microtrack profile having a substantial side-lobe that results from a magnetic read head having an ABJ-EX hard bias configuration in FIG. 2 or FIG. 3.

Ideally, a microtrack profile of a read head should appear as a symmetrical bell curve as depicted in FIG. 4. A plurality of signal amplitudes are represented along the y-axis in track average amplitude (TAA) and a plurality of head positions (offsets) are represented along the x-axis in units of microinches. The MRWu may be determined as the half maximum amplitude level. However, the ABJ-EX design as represented in FIGS. 2-3 has a severe drawback in that a side-lobe 29 commonly occurs in the microtrack profile as pictured in FIG. 5. This condition has a detrimental effect on readback performance and must be corrected to satisfy the newest design requirements.

Figure 6:
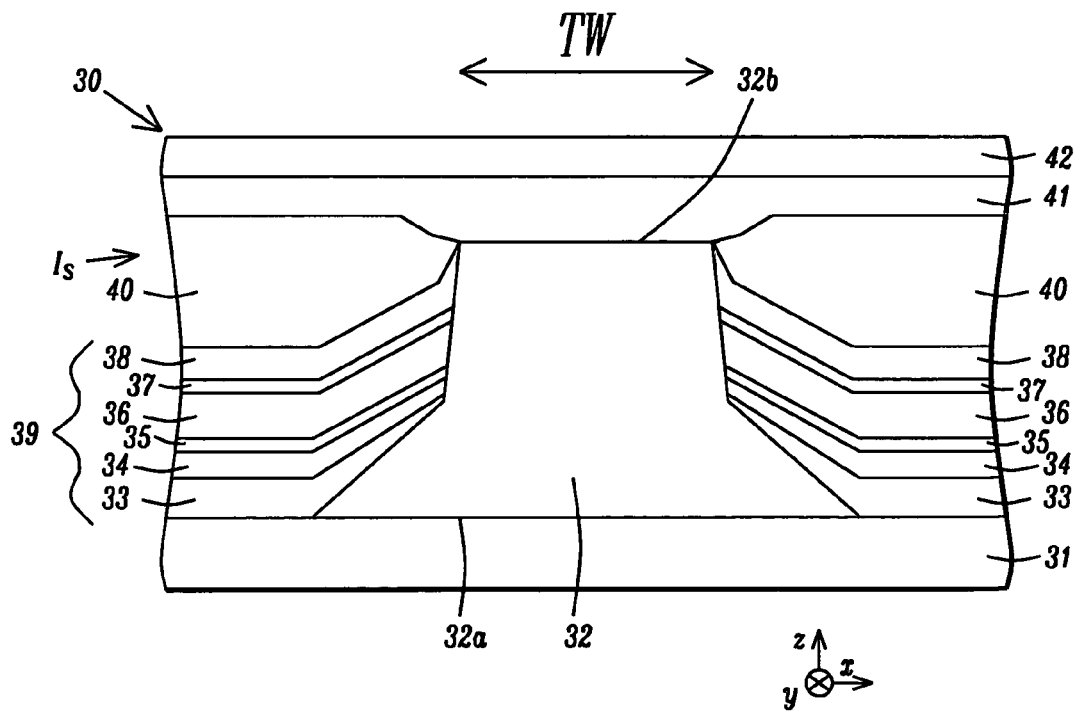
FIG. 6 depicts a read head based on a GMR-CIP sensor that is longitudinally biased by a hard bias stack according to a first embodiment of the present invention.
Figure 7:
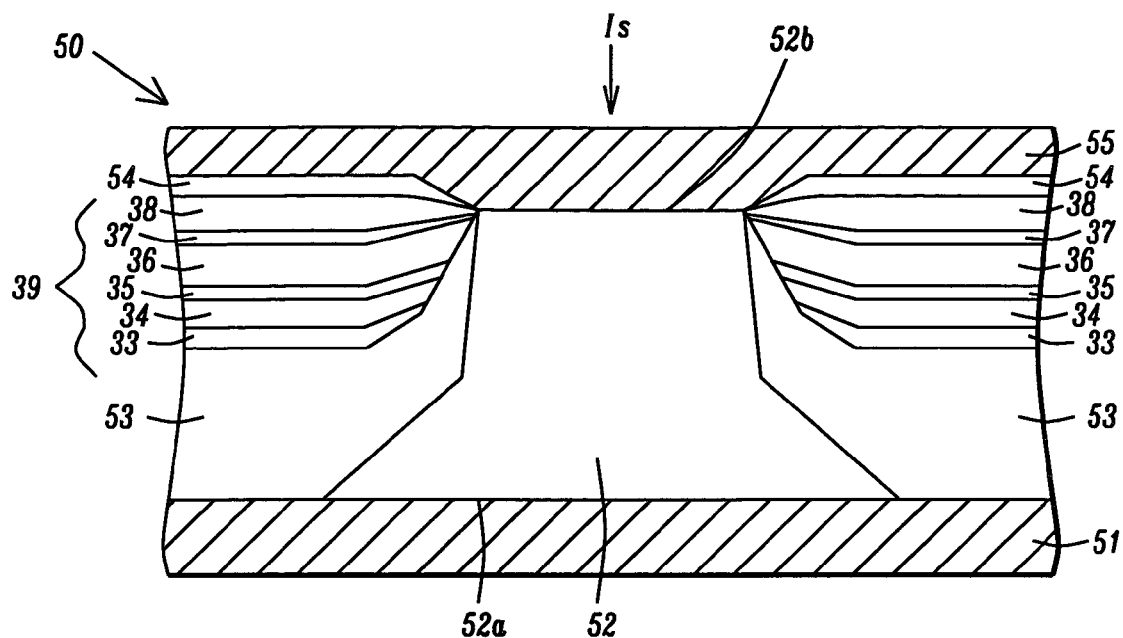
FIG. 7 shows a read head with a GMR-CPP or TMR sensor that is longitudinally biased by a hard bias stack according to a first embodiment of the present invention.

A first embodiment of the present invention is depicted in FIGS. 6-7. Referring to FIG. 6, a cross-sectional view from an ABS plane is shown of a magnetic read head 30 formed on a substrate 31. In one embodiment, the sensor element 32 is a GMR-CIP spin valve and the substrate 31 is a first gap layer such as Al$_2$O$_3$ that is disposed on a first shield (not shown). The sensor element 32 is a stack of layers comprised of an AFM layer, an overlying (or underlying) pinned layer, a free layer, a non-magnetic conductive spacer between the pinned and free layers, and an uppermost capping layer. The arrangement of the layers in the stack is dependent on whether the sensor element 32 is a bottom spin valve or top spin valve type. Note that the individual layers within the sensor element 32 are not shown in order to simplify the drawing and direct attention to the adjacent ABJ-EX hard bias structure 39. Typically, the layers within the sensor element 32 have top and bottom surfaces that are parallel to the bottom surface 32a and top surface 32b of the sensor element. The GMR sensor element generally has sloped sidewalls wherein the top surface 32b extends a shorter distance than the bottom surface 32a along the x-axis.

The AFM layer may be a PtMn or IrMn layer that is magnetized in the y direction. The AFM layer is exchange coupled to the pinned layer that may be comprised of CoFe and which is pinned in the y direction. Optionally, the pinned layer may have a synthetic anti-parallel (SyAP) configuration wherein a coupling layer such as Ru is sandwiched between an AP2 pinned layer on the AFM layer and an overlying AP1 pinned layer. The free layer may be comprised of CoFe and/or NiFe, for example, and has a magnetic moment oriented in the x direction under the influence of a longitudinal bias from the adjoining ABJ-EX hard bias structure 39 which is magnetized in the x direction and will be described in a later section. The capping layer may be comprised of Ta or Ru or may be a composite layer based on a Ru/Ta/Ru configuration, for example. Other capping layers used in the art such as a composite layer comprised of NiCr on tantalum oxide are also acceptable.

In the presence of an appropriately sized external magnetic field which can be applied when the magnetic head 30 is passed over a magnetic recording medium in the z direction, the magnetization direction in the free layer within the sensor element 32 switches to the y or -y direction. In a GMR-CIP spin valve, the changed magnetic state in the free layer may be sensed by passing a current $I_S$ through the sensor element 32 to detect a lower resistance than when the magnetization of the pinned layer and free layer are orthogonal to each other.

An important feature of the present invention is the ABJ-EX hard bias structure 39 formed on the substrate 31 and adjacent to the sidewall on each side of the sensor element 32. In one aspect, the hard bias structure 39 is comprised of a stack of layers having a seed/AFM1/FM/HB/FM/AFM2 configuration wherein the main hard bias (HB) layer 36 has a high negative $\lambda_S$ value. The seed layer 33 is preferably Ta/NiFe, Ta/Ni, Ta/Ru, Ta/Au, Ta/Cu or composites of the aforementioned combinations with NiCr or TiCr, for example, that produce a large enough exchange bias field ($H_{EX}$) of greater than about 100 Oe and a small $H_C$ of less than about 50 Oe. Optionally, the seed layer 33 may be made of Ni and one or more elements that satisfy the previously mentioned $H_{EX}$ and $H_C$ requirements. In an example where the seed layer 33 is a Ta/NiFe composite layer, the lower Ta layer is from 10 to 50 Angstroms thick and the upper NiFe layer is from 10 to 30 Angstroms thick and has a Ni content of between 50 and 100 atomic %. The Ta/NiFe composite layer is especially advantageous in improving the (111) texture of an overlying AFM1 layer 34 that is comprised of IrMn.

The AFM1 layer 34 and AFM2 layer 38 may be any type of antiferromagnetic material such as IrMn, PtMn, NiMn, RuRhMn, PtCrMn or the like and are used to produce a larger $H_{EX}$ value. However, IrMn and RuRhMn are preferred because of their low critical thicknesses of 30 Angstroms and about 50 Angstroms, respectively. It should be understood that for a disordered structure which is characteristic of ABJ-EX hard bias structure 39, no annealing is required to achieve $H_{EX}$. The thickness of the AFM1 layer 34 is between 45 and 70 Angstroms and the thickness of the AFM2 layer 38 is from 45 to 70 Angstroms. In one embodiment, the AFM1 layer 34 and AFM2 layer 38 are made from the same material. Alternatively, the AFM1 and AFM2 layers are comprised of different materials. Furthermore, the AFM2 layer 38 may be omitted when reducing the gap spacing and yet maintaining similar shield to shield topography. In other words, when the sensor element 32 is a GMR-CIP spin valve, removing the AFM2 layer 38 in the ABJ-EX hard bias structure 39 reduces the distance between the first gap 31 and second gap 41 but the distance between the bottom shield (not shown) and top shield 42 may remain the same.

The HB layer 36 is sandwiched between two ferromagnetic (FM) layers 35, 37 which are employed to enhance the exchange coupling strength between the HB layer and the AFM1 layer 34 and AFM2 layer 38. In one embodiment, the FM layers 35, 37 have a thickness between 5 and 30 Angstroms and are preferably comprised of CoFe which has an Fe content of from 20 to 40 atomic % when a large $H_{EX}$ is desired. More preferably, the Fe content in CoFe is 25 atomic %. Optionally, other ferromagnetic materials such as NiFe and CoNiFe may be used as the FM layers 35, 37.

A key component of the hard bias structure 39 is the HB layer 36 that has a thickness of from 50 to 400 Angstroms and is preferably a negative magnetostriction material having a $\lambda_S$ greater than about $-1 \times 10^{-6}$ which may be otherwise represented as $|\lambda_S| > 1 \times 10^{-6}$ wherein $\lambda_S$ is a negative value. In particular, Ni is preferred as the HB layer 36 and has the advantage over prior art HB layers in ABJ-EX designs because of its high electrical conductivity that leads to improved junction conductivity. Alternatively, other high negative $\lambda_S$ materials such as $Ni_M Fe_N$ wherein M and N represent the atomic % of Ni and Fe, respectively, and wherein M+N=100, M is about 90, and N is about 10 may be used as the HB layer 36. By adjusting the HB layer 36 thickness, the desired $M_r t$, $H_{EX}$, and $\lambda_S$ values can be achieved. During the fabrication method practiced by the inventors, a compressive stress exists after the device is lapped. Thus, when a high negative magnetostriction material such as Ni or $Ni_{90}Fe_{10}$ is employed as the HB layer 36, the compressive stress will induce a strong in-plane anisotropy that produces an effective longitudinal biasing layer and thereby stabilizes the sensor element 32.

Above the hard bias structure 39 on each side of the sensor element 32 is a lead or electrode 40. The leads may be a composite layer in which a thicker conductive layer such as Au or Cu is sandwiched between thinner Ta layers. In one embodiment (not shown), the leads 40 are comprised of a 30 Angstrom thick first Ta layer on the hard bias structure 39, a 400 Angstrom thick gold or copper layer on the first Ta layer, and a 30 Angstrom thick second Ta layer on the gold or copper layer. The distance between the leads 40 on the top surface 32b is the track width (TW) of the read head 30. The remainder of the read head 30 is comprised of a second gap layer 41 formed on the leads 40 and top surface 32b and a second shield 42 on the second gap layer.

TABLE 1

Magnetic properties of various Ni-based ABJ-EX stacks with different seed layers

| Seed layer | Biasing layer configuration | Mrt | Hex (Oe) | Hc (Oe) |
|---|---|---|---|---|
| Ta30/NiFe20 | IrMn50/FM20/Ni330/FM20/IrMn50 | 2.15 | 123 | 25 |
| Ta30/NiFe20 | IrMn50/FM20/Ni250/FM20/IrMn50 | 1.79 | 153 | 6 |
| Ta30/NiFe20 | IrMn50/FM10/Ni400/FM10/IrMn50 | 2.22 | 96 | 12 |
| Ta30/NiFe20 | IrMn50/FM10/Ni200/FM10/IrMn50 | 1.38 | 188 | 6 |
| Ta30/NiFe20 | IrMn50/FM10/Ni170/FM10/IrMn50 | 1.09 | 221 | 21 |

TABLE 1-continued

Magnetic properties of various Ni-based ABJ-EX stacks with different seed layers

| Seed layer | Biasing layer configuration | Mrt | Hex (Oe) | Hc (Oe) |
|---|---|---|---|---|
| Ta30/ NiFe20 | IrMn50/FM10/Ni150/FM10/IrMn50 | 0.99 | 262 | 22 |
| Ta30/ NiFe20 | IrMn50/FM10/Ni130/FM10/IrMn50 | 0.88 | 288 | 13 |
| Ta30/ Ni20 | IrMn50/FM10/Ni170/FM10/IrMn50 | 1.09 | 239 | 9 |
| Ta30/ Ni20 | IrMn50[FM10/Ni130/FM10/IrMn50] × 2 | 1.76 | 269 | 28 |

Results in Table 1 are from an experiment where the FM layers are $Co_{75}Fe_{25}$. In this ABJ-EX biasing design, the inventors have found that Ni effectively acts as a side shield. As a result, some benefit is achieved in reducing the MRWu. For instance, a smaller MRWu is achieved in the present invention compared with a conventional ABJ-HB design for a similar photo critical dimension (CD) in the sensor element. The sensor element CD is the width of the top surface 32b also known as the track width (TW). Because of its intrinsic better longitudinal biasing efficiency compared with that of a conventional ABJ-HB design or an earlier version (AFM1/HB/AFM2) of an ABJ-EX stack such as seed/IrMn50/NiFe300/IrMn50, the ABJ-EX biasing configuration of the present invention should show better output/asymmetry sigma performance. Indeed, the advantages including a lower MRWu, better output amplitude, and improved asymmetry sigma have been confirmed. Another important advantage is that sidelobe occurrence in the microtrack profiles has been completely removed on five wafers (substrates) tested thus far.

As indicated by the last entry in Table 1, the present invention also anticipates a multilayer hard bias configuration represented by seed/AFM1[FM/HB/FM/AFM2]×2 in which two FM/HB/FM/AFM2 stacks are formed on the AFM1 layer.

As illustrated in FIG. 7, the first embodiment also encompasses a hard bias structure 39 that is incorporated in a magnetic read head 50 based on a GMR-CPP or TMR sensor. There is a GMR-CPP or TMR sensor element 52 formed on a substrate 51 which is a bottom shield. The bottom shield 51 may have a capping layer (not shown). The sensor element 52 is comprised of the same layers as in the sensor element 32 except the spacer between the pinned and free layers is replaced by a tunnel barrier layer (not shown) typically made of $Al_xO_Y$ in an embodiment where the read head 50 is based on a TMR sensor. There is a first insulation layer 53 comprised of $Al_2O_3$ disposed on the bottom shield 51 and along the sidewalls on either side of the sensor element 52 in order to insulate the bottom shield from the top shield 55. The hard bias structure 39 described previously is formed on the first insulation layer 53. As noted earlier, the AFM2 layer 38 may be omitted. Moreover, the hard bias structure 39 may also have a multilayer stack represented by seed/AFM1[FM/HB/FM/AFM2]×2. Optionally, a second insulation layer 54 may be inserted between the hard bias structure 39 and the top shield 55. The sensing current $I_S$ travels perpendicular to the top surface 52b and bottom surface 52a of the sensor element 52.

In order to stabilize a GMR-CPP or TMR type of sensor, the $M_r t$ of the HB layer 36 has to be larger than for a GMR-CIP sensor since the free layer and HB layer are separated by the insulation layer 53. Furthermore, the seed layer 33 may be removed to reduce the spacing between the free layer (not shown) and HB layer 36 and thereby increase the biasing strength. The advantages of high output amplitude, better asymmetry sigma, lower MRWu, and reduced sidelobe occurrence are also realized when the hard bias structure 39 of the present invention is used to stabilize a GMR-CPP or TMR sensor in a read head. Additionally, the magnetic read head resistivity (MRR) can be reduced significantly, especially for TMR applications.

TABLE 2

DP performance comparison between ABJ-HB and Ni-based ABJ-EX biasing schemes

| Design | Slider MRR | MRWu | MRWu50/ MRWu10 | Asym. σ | TAAL (mV) | Spi S/N t2 (dB) |
|---|---|---|---|---|---|---|
| ABJ-HB | 47 | 0.118 | 47.3 | 11.9 | 1.14 | 13.8 |
| ABJ-EX | 43.3 | 0.112 | 47.7 | 11.2 | 1.25 | 14.1 |

Results in Table 2 compare the DP (dynamic probing for device in a hard drive like environment) performance of a conventional ABJ-HB design to the Ni-based ABJ-EX scheme of the present invention. Under similar output asymmetry sigma, the output amplitude (TML) is higher for the ABJ-EX biasing scheme with improved MRWu, signal to noise (S/N) ratio, and MRWu50/MRWu10 which is a measure of the microtrack profile sharpness or resolution. Additionally, the slider MRR is significantly reduced in the ABJ-EX example for a read head with a GMR-CIP sensor. This MRR reduction becomes even greater when the improved ABJ-EX biasing configuration of the present invention is applied in TMR sensor stabilization.

Figure 8:
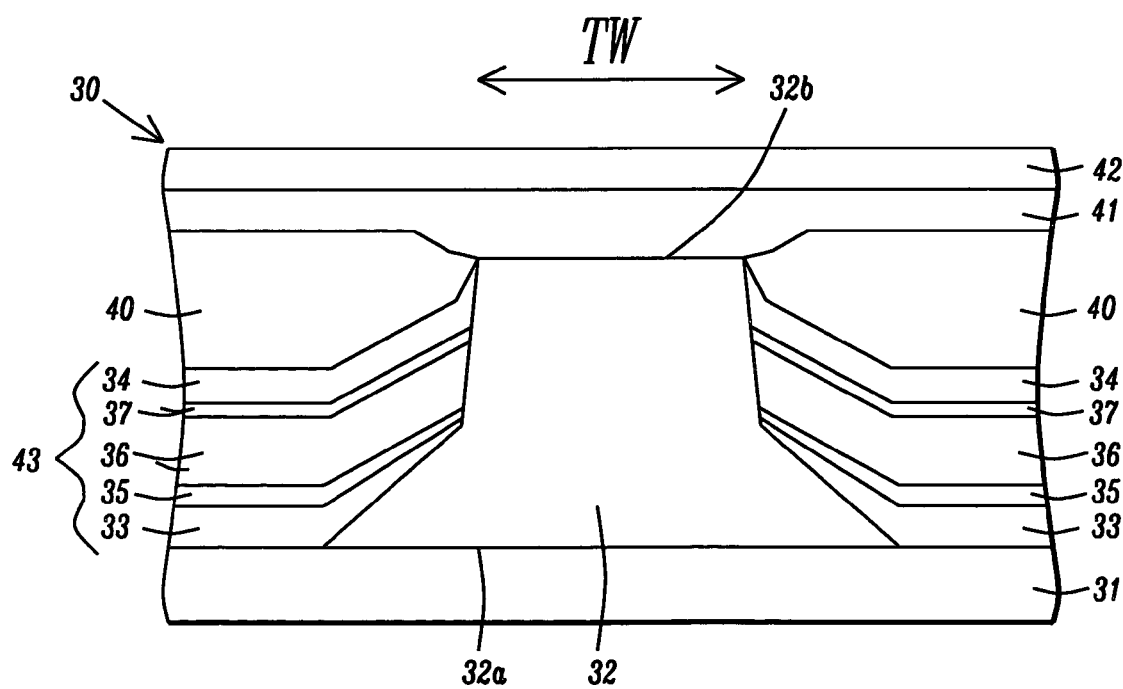
FIG. 8 depicts a read head based on a GMR-CIP sensor that is longitudinally biased by a hard bias stack according to a second embodiment of the present invention.
Figure 9:
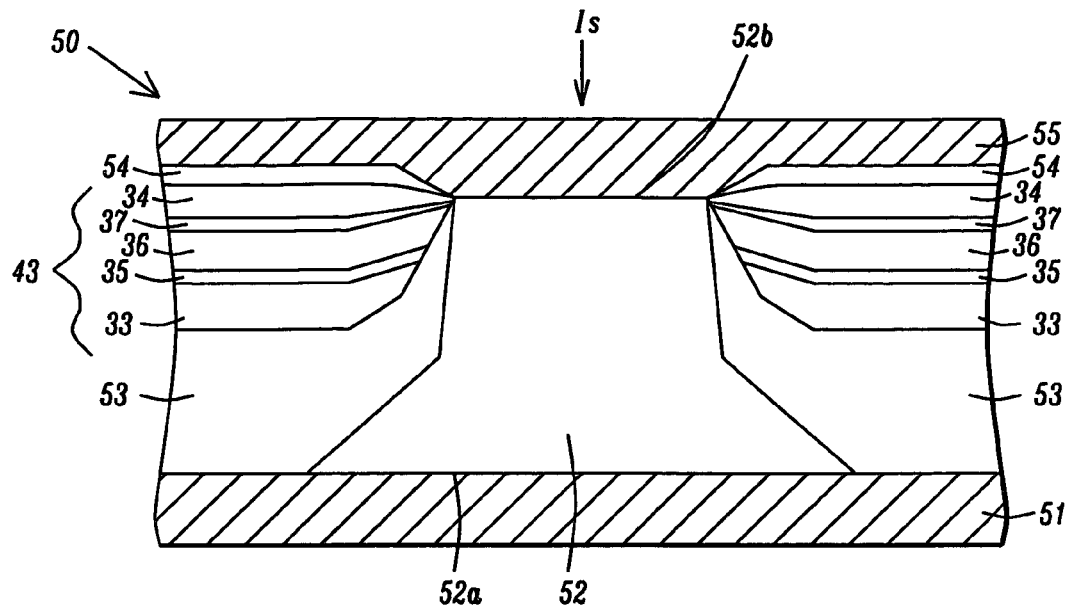
FIG. 9 shows a read head based on a GMR-CPP or TMR sensor that is longitudinally biased by a hard bias stack according to a second embodiment of the present invention.

A second embodiment of the present invention is depicted in FIGS. 8-9 and involves modifying the hard bias structure described earlier to a seed/FM/HB/FM/AFM1 configuration hereafter referred to as hard bias structure 43. In one aspect, the hard bias structure 43 is used to stabilize the sensor element 32 in read head 30 as shown in FIG. 8. All of the layers in FIG. 8 were described previously. However, the HB structure 43 differs from the hard bias structure 39 in the first embodiment in that the AFM2 layer has been removed and the AFM1 layer is now disposed on the upper FM layer 37. In other words, the sandwich comprised of lower FM layer 35, HB layer 36, and upper FM layer 37 is formed directly on the seed layer 33. This configuration may be preferred when the shield to shield topography becomes more important and a slight reduction in $H_{EX}$ is acceptable.

The leads 40 are formed on the AFM1 layer 34 on either side of the sensor element 32. The second gap layer 41 and second shield 42 are successively formed on the leads 40 and top surface 32b of the sensor element as in the first embodiment.

Alternatively, the HB structure 43 may be used to stabilize a GMR-CPP or TMR sensor as depicted in FIG. 9. Note that the all the layers in the sensor element 52 are the same as in the first embodiment (FIG. 7) except the hard bias structure 39 is replaced by the HB structure 43. Optionally, the second insulation layer 54 may be omitted. The advantages of the second embodiment are the same as those achieved in the first embodiment.

The present invention is also a method of fabricating a stabilized magnetic read head having a high output amplitude with reduced MRWu and essentially no sidelobe occurrence in the microtrack profiles from a readback operation. The method involves the formation of a hard biasing configuration adjacent to the sensor element as described in the first or second embodiments.

Figure 10:
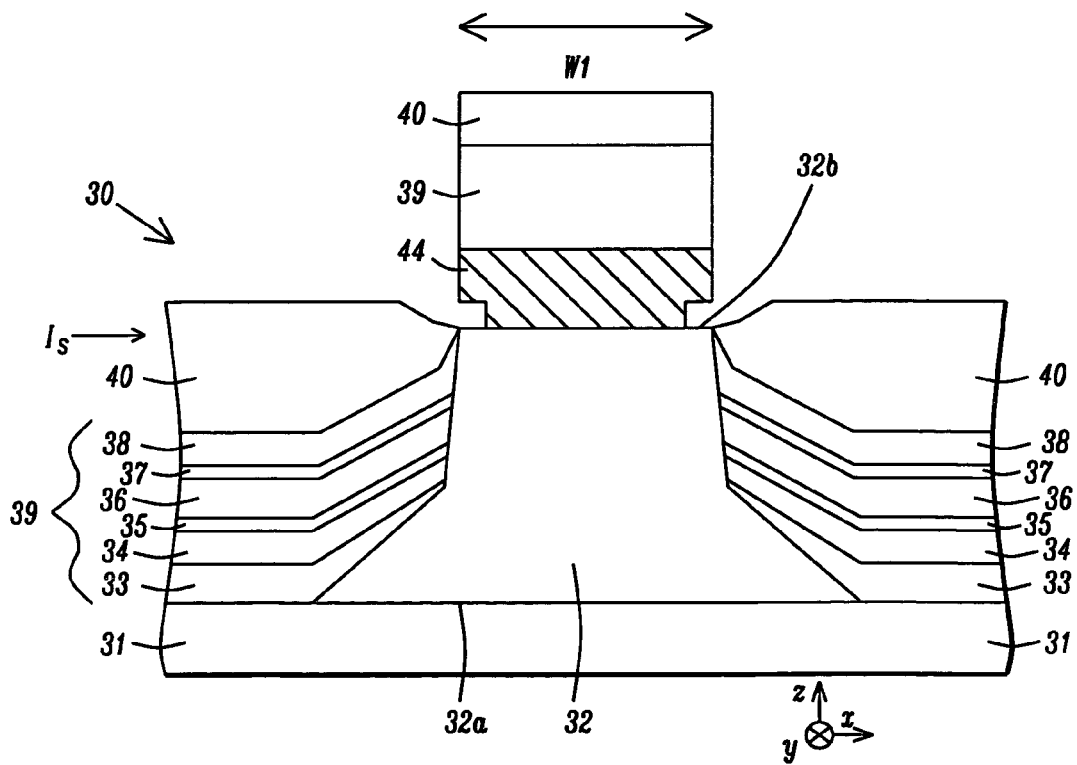
FIG. 10 shows an intermediate step in forming the read head depicted in FIG. 6 according to a method of the present invention.

Referring to FIG. 10, an intermediate step is shown during the formation of the GMR-CIP read head 30 as depicted in FIG. 6. Substrate 31 which in one embodiment is a first gap layer disposed on a first shield is deposited by conventional means. Sensor element 32 is typically fabricated by sequentially depositing a stack of layers on substrate 31 by a well known argon sputtering technique, for example, wherein the stack includes an AFM layer with an adjacent pinned layer, a free layer, a spacer between the free and pinned layers, and an uppermost capping layer. The exact order of layers within the stack depends on whether a top spin valve, bottom spin valve, or multilayer spin valve is formed. A photoresist layer 44 having a width $w_1$ is patterned on the top surface 32b of the sensor element 32 and then an ion beam etch (IBE) process is used to remove regions of the sensor stack that are not covered by the photoresist layer. The etch stops on the first gap layer ($Al_2O_3$ or silicon oxide) in substrate 31. Due to the nature of the IBE process, the sidewalls of the sensor element 32 are sloped since the top surface 32b typically extends a shorter distance along the x-axis than the bottom surface 32a. Note that the photoresist layer 44 preferably has an undercut along both sides at its interface with the top surface 32b of the sensor element to facilitate a subsequent liftoff removal step.

An important feature of the present invention is the hard bias structure 39 which is deposited by a sputtering or IBD method on the first gap layer 31. A seed layer 33 such as Ta/NiFe or Ta/Ni may be deposited on exposed regions of the first gap layer 31 and along a portion of the sensor element 32 by a sputtering method or ion beam deposition (IBD). The remainder of the hard bias structure 39 is comprised of an AFM1/FM/HB/FM/AFM2 configuration that was described in the first embodiment. The layers 34-38 are deposited in sequential order and preferably in the same process tool that may be an Anelva 7100 system or the like which includes ultra high vacuum sputter chambers and oxidation chambers and has the capability to form all layers in the hard bias structure 39 after a single pump down step. Alternatively, the AFM2 layer 38 is omitted when a seed/AFM1/FM/HB/FM configuration is employed. One or more of the layers in the hard bias structure may be annealed during or after deposition as is understood by those skilled in the art. In particular, the AFM1 layer 34 and AFM2 layer 38 can be annealed to improve the exchange bias field.

It should be understood that a similar process is used to form the hard bias structure 43 shown in FIG. 8 except that the sequential deposition of layers is changed to the following order: seed layer 33; FM layer 35; hard bias layer 36; FM layer 37; and AFM1 layer 34 to form the seed/FM/HB/FM/AFM1 configuration of the second embodiment. Optionally, the seed layer 33 may be removed to further reduce the gap spacing which is the distance between the first gap 31 and second gap 41.

Continuing with FIG. 10, an electrical lead 40 is deposited by a sputtering or IBD method on the hard bias structure 39 on each side of the sensor element 32. Although the leads 40 are connected to the sides of the sensor element adjacent to the top surface 32b in the exemplary embodiment, the present invention also anticipates a configuration (not shown) in which the leads are attached to the top surface 32b at a certain distance from the sidewalls of the sensor element 32. Note that the sputtering or IBD process steps also leave a hard bias stack 39 and a lead layer 40 above the photoresist layer 44.

Referring again to FIG. 6, a conventional lift-off process is used to remove the photoresist layer 44 and the overlying hard bias stack 39 and lead layer 40. Thereafter, a second gap layer 41 is disposed on the leads 40 and top surface 32b and a second shield 42 is formed on the second gap layer 41 by conventional methods to complete the magnetic read head 30. The second shield 42 preferably has a smooth top surface in order to improve the process latitude for subsequent process steps that could involve a write head fabrication as an example.

The properties of the hard bias structure 39 of the present invention are very stable with or without annealing. Although no annealing is necessary, the hard bias structure 39 may be annealed by heating the substrate 31 at a temperature of about 200° C. to 250° C. in a $N_2$ ambient for a period of about 0.5 to 5 hours.

Those skilled in the art will appreciate that a similar process sequence is followed in a second embodiment except that the hard bias structure 39 is replaced by the hard bias structure 43 on substrate 31. In this case, leads 40 are formed on the AFM1 layer 34 on each side of the sensor element 32 followed by a lift off process to remove the photoresist mask and then formation of the second gap layer 41 and second shield 42 as shown in FIG. 8.

Figure 11:
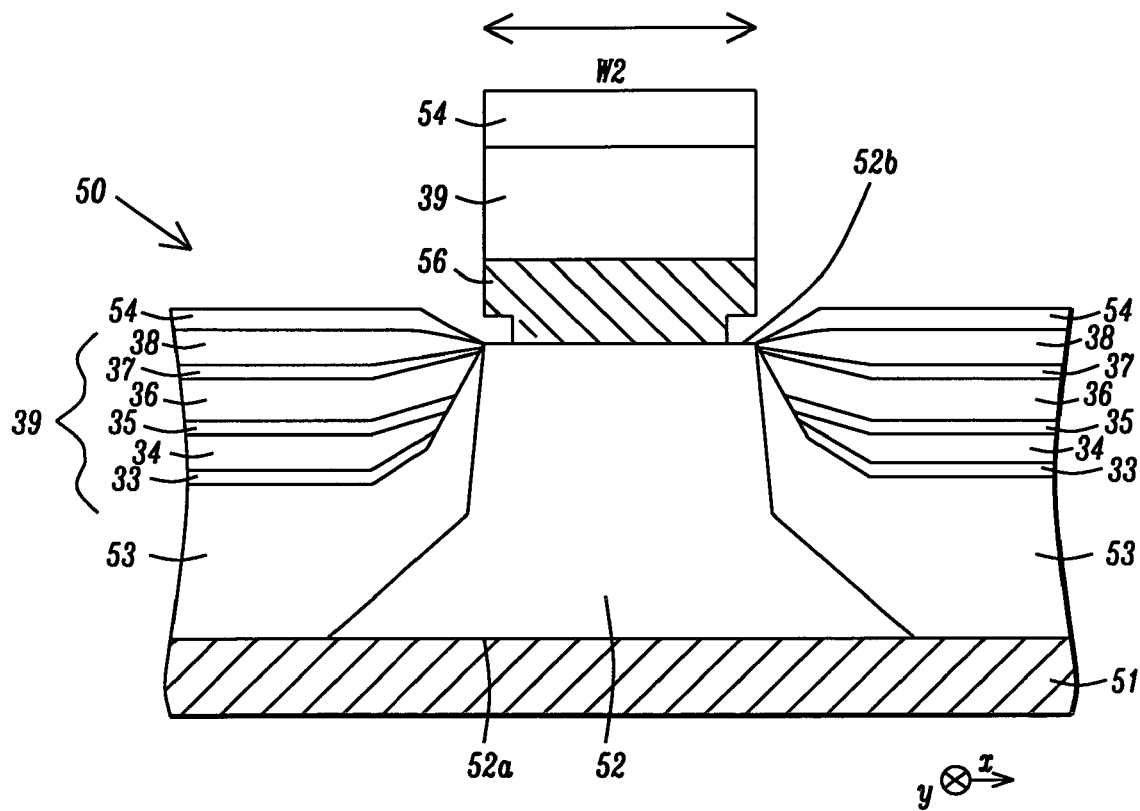
FIG. 11 shows an intermediate step in forming the read head depicted in FIG. 7 according to a method of the present invention.

In an embodiment where a GMR-CPP or TMR read head 50 (FIG. 7) is formed, an intermediate step during the fabrication process is illustrated in FIG. 11. The substrate 51 that is typically a bottom (S1) shield with an optional capping layer (not shown) is deposited by a conventional method. Sensor element 52 is typically fabricated by a well known argon sputtering technique that sequentially deposits a stack of layers on substrate 51 wherein the sensor stack includes an AFM layer and an adjacent pinned layer, a free layer, a tunnel barrier layer between the free and pinned layers, and an uppermost capping layer. The stack of layers in the sensor element 52 may be deposited in the same process tool in which the shield capping layer is formed. Preferably, the process tool is an Anelva 7100 system or the like. The method of the present invention also encompasses one or more annealing steps after all of the layers in the sensor stack are deposited. For example, the AFM1 layer 34 may be annealed while applying an external magnetic field along the y-axis. In the case of a TMR read head, the free layer may be annealed by applying a smaller external magnetic field along the x-axis.

A photoresist layer 56 having a width $w_2$ is patterned on the top surface 52b of the sensor stack and then an IBE process is used to remove regions of the sensor stack that are not covered by the photoresist layer. Preferably, an undercut profile is generated adjacent to the top surface 52b at the bottom corners of the photoresist layer 56 to facilitate a subsequent lift-off step. The etch stops on the substrate 51 and typically generates a sensor element 52 having sloped sidewalls such that the bottom surface 52a has a width greater than $w_2$.

After the IBE process, a first insulation layer 53 preferably comprised of $Al_2O_3$ is deposited to a thickness of about 50 to 250 Angstroms by a chemical vapor deposition (CVD) or physical vapor deposition (PVD) on the sidewalls of the sensor element 52 and on the first shield 51. Next, the hard bias structure 39 is deposited on the first insulation layer 53 by an IBD method as described previously. The AFM2 layer 38 may be omitted in some applications. An annealing step may be performed during or after deposition of certain layers in the hard bias structure 39. Optionally, a second insulation layer 54 comprised of $Al_2O_3$ may be deposited on the hard bias structure 39 by a CVD or PVD technique.

Returning to FIG. 7, the photoresist layer 56 and overlying layers 39, 54 are lifted off by a conventional method to uncover the top surface 52b. Note that a portion of the hard bias structure 39 (and second insulation layer 54) may extend above the level of the top surface 52b. A top (S2) shield 55 is then formed on the top surface 52b and second insulation layer 54 by a well known method to complete the read head 50.

It should be understood that a similar sequence may be followed except that the hard bias structure 39 is replaced by the hard bias structure 43 on the first insulation layer 53 to form the read head 50 shown in FIG. 9. In this case, the sequential deposition of layers is changed to the following order: seed layer 33; FM layer 35; hard bias layer 36; FM layer 37; and AFM1 layer 34 to form the seed/FM/HB/FM/AFM1 configuration of the second embodiment. A second insulation layer 54 may be deposited on the hard bias structure 43 by a CVD or PVD technique. Subsequent process steps involve formation a lift off step to remove the photoresist layer 56, and then formation of a second shield 55. The properties of the hard bias structure 43 of the present invention are very stable with or without annealing. Although no annealing is necessary, the hard bias structure 43 may be annealed by heating the substrate 51 at a temperature of about 200° C. to 250° C. in a $N_2$ ambient for a period of 0.5 to 5 hours.

While this invention has been particularly shown and described with reference to, the preferred embodiment thereof, it will be understood by those skilled in the art that various changes in form and details may be made without departing from the spirit and scope of this invention.

We claim:

1. A hard bias structure for providing a longitudinal bias to a free layer in a magnetoresistive (MR) element within a magnetic read head, said MR element has two sides adjoining an air bearing surface (ABS) and said hard bias structure is formed on a substrate on each side of the MR element and comprises:
   (a) a first antiferromagnetic (AFM1) layer;
   (b) a ferromagnetic (FM) layer on the AFM1 layer;
   (c) a hard bias (HB) layer formed on the FM layer and having a sufficiently high negative magnetostriction ($\lambda_S$) value such that a compressive stress resulting from a lapping process will induce a strong in-plane anisotropy in said hard bias layer that effectively maintains a single magnetic domain state in the free layer; and
   (d) a second FM layer on the hard bias layer to form a AFM1/FM/HB/FM configuration.

2. The hard bias structure of claim 1 wherein the MR element is a GMR-CIP sensor, GMR-CPP sensor, TMR sensor, or a multilayer sensor.

3. The hard bias structure of claim 1 further comprised of a seed layer that is comprised of Ta/NiFe, Ta/Ni, Ta/Ru, Ta/Au, Ta/Cu or composites of the aforementioned combinations with NiCr or TiCr wherein said seed layer is formed between the substrate and the AFM1 layer.

4. The hard bias structure of claim 3 further comprised of a second AFM (AFM2) layer formed on the second FM layer to form a seed/AFM1/FM/HB/FM/AFM2 configuration.

5. The hard bias structure of claim 1 wherein the hard bias layer is comprised of Ni or NiFe that has a composition represented by $Ni_M Fe_N$ wherein M and N are the atomic % of Ni and Fe, respectively, and wherein M+N=100, M is about 90, and N is about 10.

6. The hard bias structure of claim 4 wherein the AFM1 and AFM2 layers are comprised of IrMn, PtMn, NiMn, RuRhMn, or PtCrMn.

7. The hard bias structure of claim 1 wherein the FM layers are comprised of CoFe, NiFe, or CoNiFe.

8. The hard bias structure of claim 2 wherein the MR element is a TMR sensor or a GMR-CPP sensor and wherein the magnetic read head is further comprised of an insulation layer that separates the hard bias structure from the substrate and from the MR sensor.

9. The hard bias structure of claim 1 wherein $\lambda_S$ is represented as $|\lambda_S|>1\times10^{-6}$ wherein $\lambda_S$ is a negative value.

10. The hard bias structure of claim 4 wherein the seed layer is a composite layer comprised of a 20 Angstrom thick NiFe film on a 30 Angstrom thick Ta film, the AFM1 and AFM2 layers are IrMn layers with a thickness of about 50 Angstroms, the hard bias layer is a Ni layer with a thickness between about 130 to 400 Angstroms, and the FM layers have a thickness of about 10 to 20 Angstroms and are comprised of CoFe in which the Co content is about 75 atomic % and the Fe content is about 25 atomic %.

11. The hard bias structure of claim 4 further comprised of a (FM/HB/FM/AFM2) stack on said AFM2 layer to form a multilayer hard bias configuration represented by seed/AFM1/[FM/HB/FM/AFM2]×2.

12. A hard bias structure for providing a longitudinal bias to a free layer in a magnetoresistive (MR) element within a magnetic read head, said MR element has two sides adjoining an air bearing surface (ABS) and said hard bias structure is formed on a substrate on each side of the MR element and comprises:
   (a) a lower ferromagnetic (FM) layer;
   (b) a hard bias (HB) layer on the lower FM layer, said HB layer has a sufficiently high negative magnetostriction ($\lambda_S$) value such that a compressive stress resulting from a lapping process will induce a strong in-plane anisotropy in said hard bias layer that effectively maintains a single magnetic domain state in the free layer;
   (c) an upper FM layer on the hard bias (HB) layer; and
   (d) an antiferromagnetic (AFM1) layer on the upper FM layer to form an FM/HB/FM/AFM1 configuration.

13. The hard bias structure of claim 12 wherein the MR element is a GMR-CIP sensor, GMR-CPP sensor, TMR sensor, or a multilayer sensor.

14. The hard bias structure of claim 12 further comprised of a seed layer that is comprised of Ta/NiFe, Ta/Ni, Ta/Ru, Ta/Au, Ta/Cu or composites of the aforementioned combinations with NiCr or TiCr wherein said seed layer is formed between the substrate and the lower FM layer.

15. The hard bias structure of claim 12 wherein the hard bias layer has a thickness from about 130 to 400 Angstroms and is comprised of Ni or NiFe that has a composition represented by $Ni_M Fe_N$ wherein M and N are the atomic % of Ni and Fe, respectively, and wherein M+N=100, M is about 90, and N is about 10.

16. The hard bias structure of claim 12 wherein the AFM1 layer is comprised of IrMn, PtMn, NiMn, RuRhMn, or PtCrMn with a thickness between about 45 and 70 Angstroms.

17. The hard bias structure of claim 12 wherein the FM layers are comprised of CoFe, NiFe, or CoNiFe with a thickness of about 5 to 30 Angstroms.

18. The hard bias structure of claim 12 wherein the MR element is a TMR sensor or a GMR-CPP sensor and wherein the magnetic read head is further comprised of an insulation layer that separates the hard bias structure from the substrate and from the MR sensor.

19. The hard bias structure of claim 12 wherein $\lambda_S$ is represented as $|\lambda_S|>1\times10^{-6}$ wherein $\lambda_S$ is a negative value.

20. The hard bias structure of claim 14 wherein the seed layer is a composite comprised of a NiFe layer with a thickness of about 20 Angstroms on a Ta layer having a thickness of about 30 Angstroms or is a composite comprised of a Ni layer about 20 Angstroms thick on a Ta layer about 30 Angstroms thick.

* * * * *